United States Patent [19]

Rice

[11] Patent Number: 4,642,218

[45] Date of Patent: Feb. 10, 1987

[54] HOT ROLLING OF CERAMICS BY THE USE OF SELF PROPAGATING SYNTHESIS

[75] Inventor: Roy W. Rice, Alexandria, Va.

[73] Assignee: The United States of America as represented by the Secretary of the Navy

[21] Appl. No.: 662,933

[22] Filed: Oct. 19, 1984

[51] Int. Cl.[4] ............................................. C22C 32/00
[52] U.S. Cl. ...................................... 419/11; 419/10; 419/12; 419/15; 419/16; 419/17; 419/34; 419/45; 419/50; 419/52; 419/63; 419/69; 264/80; 264/102; 264/125; 264/332
[58] Field of Search ...................... 419/10, 11, 12, 15, 419/16, 17, 34, 50, 69, 52, 63, 45; 264/80, 102, 125, 332

[56] References Cited

U.S. PATENT DOCUMENTS

| | | | |
|---|---|---|---|
| 2,599,185 | 6/1952 | Lepp et al. | 419/45 |
| 3,150,973 | 9/1964 | Storchheim | 75/208 |
| 3,194,858 | 7/1965 | Storchheim | 264/111 |
| 3,353,954 | 11/1967 | Williams | 419/45 |
| 3,505,438 | 4/1970 | Biddulph | 264/66 |
| 3,690,961 | 9/1972 | Berghetan | 419/34 |
| 4,126,451 | 11/1978 | Nayar | 75/208 R |
| 4,585,617 | 4/1986 | Tenhover et al. | 419/45 |
| 4,585,618 | 4/1986 | Fresnel et al. | 419/34 |

Primary Examiner—Stephen J. Lechert, Jr.
Attorney, Agent, or Firm—Sol Sheinbein; Ansel M. Schwartz

[57] ABSTRACT

A method for producing high technology ceramics with minimal porosity comprising the steps of filling a can with a constituent powder of a ceramic, creating a vacuum in the can and maintaining the vacuum throughout the entire process; outgassing the powder in the can by placing a furnace around the area of the can that encloses the powder and heating the furnace to at least 100° C.; removing the furnace after a minimum of five minutes of heating; cold rolling the can in a rolling system; igniting the powder so a localized propagation reaction front is created; and hot rolling the can in the rolling system so the propagation reaction front is maintained between the rolls of the rolling system.

24 Claims, 5 Drawing Figures

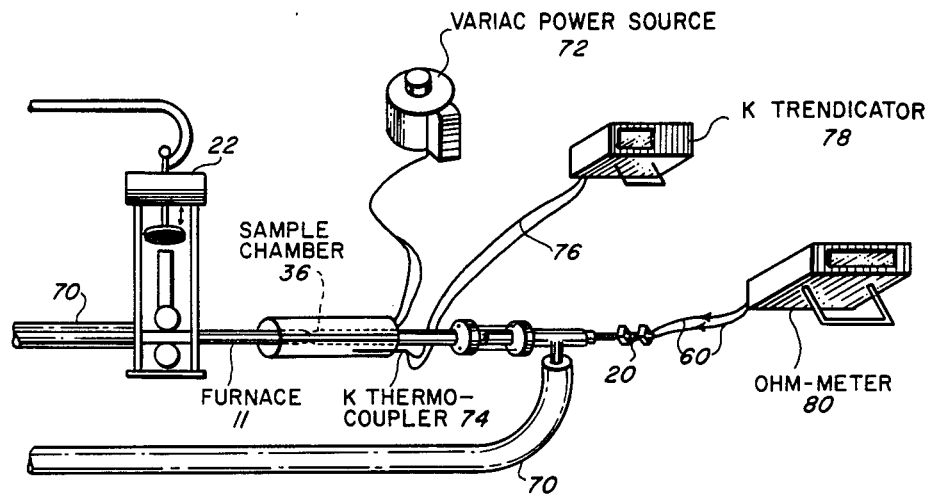
FIG. 3
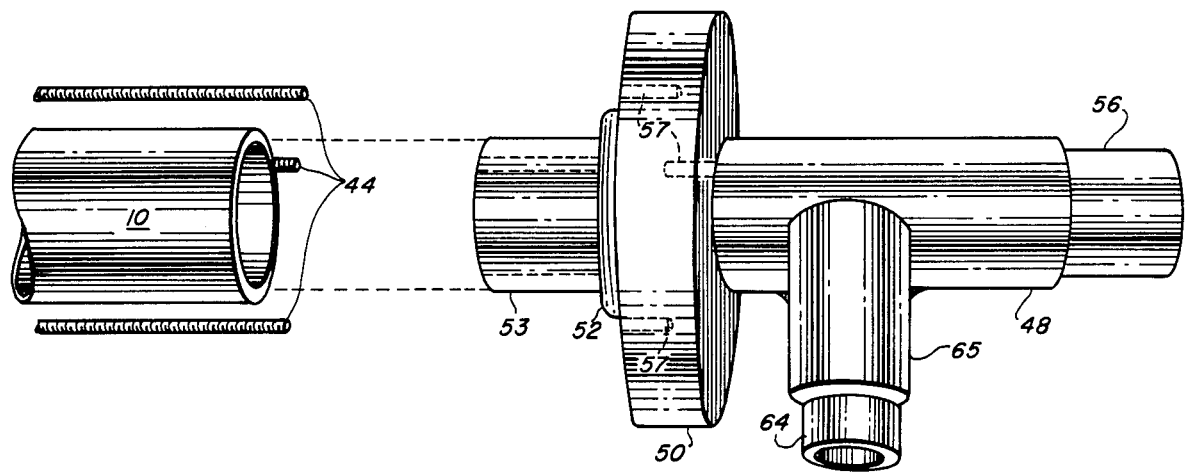
FIG. 4
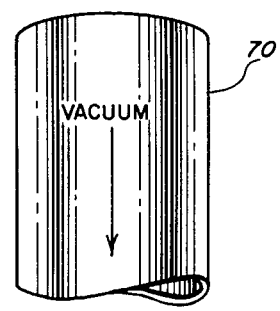

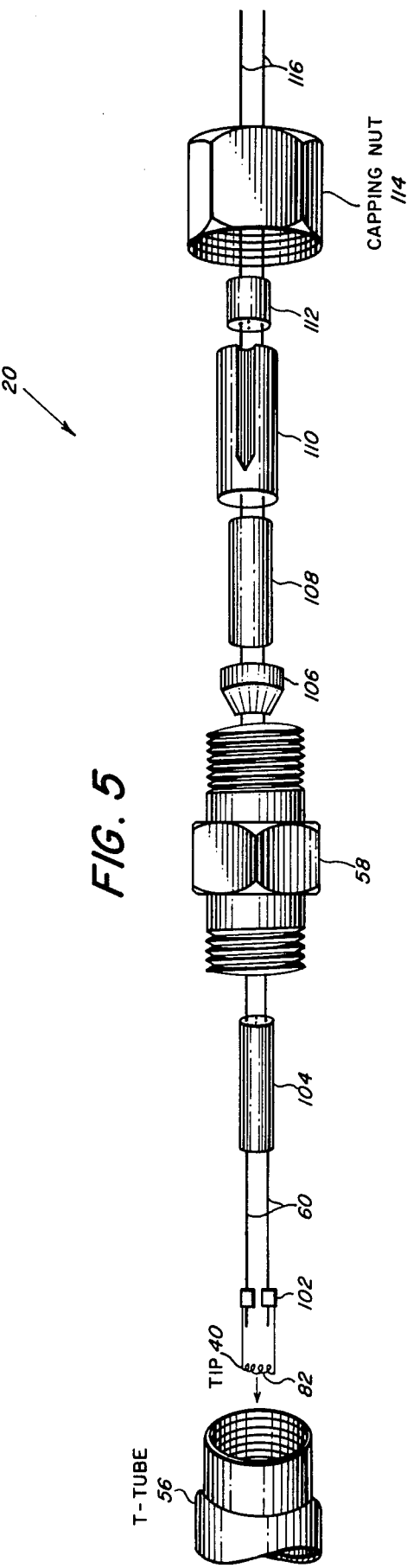

HOT ROLLING OF CERAMICS BY THE USE OF SELF PROPAGATING SYNTHESIS

BACKGROUND OF THE INVENTION

The present invention relates to the process of hot rolling of ceramics. More specifically, this invention involves the hot rolling of ceramics in conjunction with the self propagation synthesis process.

There has developed a great need for high technology ceramics such as $TiB_2$ or $B_4C$ in a variety of applications where extreme strength for a given weight of material is required. The customary process for producing such ceramics is by the batch process of hot pressing or sintering. Hot pressing typicaly in graphite dies, affords the highest density and finest grain size for good physical properties of the ceramics. However, hot pressing is a time consuming process limited by the size and number of dies that are available and especially the time-temperature-pressure constraints. A possible approach to resolving this issue would be to hot roll ceramics. However, ceramics typically do not show sufficient plasticity to be hot rolled in bulk form nor sufficiently high rates of densification if hot rolled in powder form to allow this to be done at practical pressures, temperatures and rates.

Recently there has been substantial interest in the processing of ceramics by self-propagating synthesis (SPS), otherwise known as self-propagating high temperature synthesis (SPHTS) or SHATS. This method involves the use of a chemical reaction to form the desired compound. A typical example and one of considerable interest, is the formation of $TiB_2$ by the mixing of titanium and boron powders uniformly and then consolidating them in a pellet. The reaction is then ignited in the pellet, for example by heating one end of the pellet by a small electrical coil to the point where the reaction between the elemental powder constituents becomes spontaneous and the reaction propagates through the body. While this is potentially an intriguing method of processing, it has a variety of serious questions. One is whether it is really significantly more energy efficient than conventional processing. Another intrinsic problem is the fact that it can involve substantial amounts of porosity. First, there are, of course, pores between the powder particles that must be eliminated. Secondly, the reaction to form the compounds intrinsically generates porosity since the density of the resultant compounds is invariably greater than the average density of the starting constituents. Note that because of these porosity issues, it has commonly been either necessary or important to apply a mechanical load to the compact during reaction in order to consolidate it to high density, further reducing some of the possible advantage of this type of processing over hot pressing.

SUMMARY OF THE INVENTION

Accordingly, one object of this invention is to provide a novel method for producing high technology ceramics.

Another object of this invention is to provide a novel method of producing high technology ceramics that utilizes hot rolling and the SPS process.

Another object of this invention is to provide a novel method of producing the purest and least porous high technology ceramics possible.

Briefly, the above objects are realized by a method of producing high technology ceramics with minimal porosity comprising the steps: filling a can with a constituent powder of a ceramic; igniting the powder at a localized point so a reactive front is created that propagates from the point; and applying localized presure to the can such that the propagation reaction front in the ignited powder is subjected to that pressure.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 3 is a schematic drawing of the outgassing system;

FIG. 4 is a drawing of the copper T-Tube and attachments;

FIG. 5 is a drawing of the igniter system.

DESCRIPTION OF THE PREFERRED EMBODIMENTS

Figure 1:
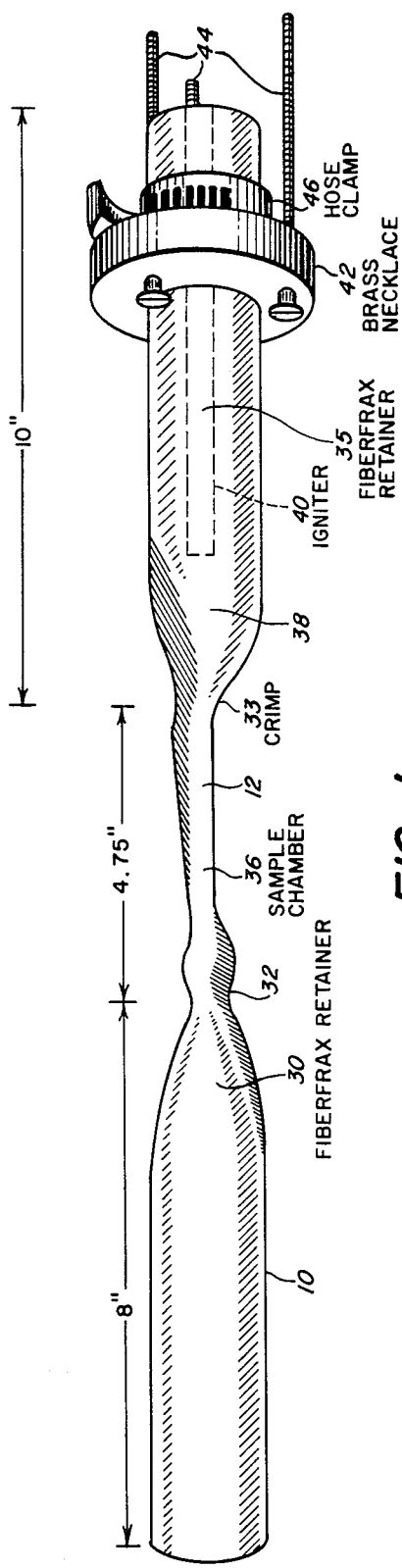
FIG. 1 is a drawing of the can that holds the constituent powder of the ceramic.

Referring now to the drawings, wherein like reference numerals designate identical or corresponding parts throughout the several views, and more particularly to FIG. 1 thereof, a can 10 is filled with powder 12 that ultimately forms the desired ceramic product. The powder 12, prior to entry into the can 10 is uniformly mixed so the constituents that make up the powder 12 form a homogeneous mixture. Either a stoichiometric or non-stoichiometric mixture of the constituents of the powder that forms the desired ceramic product is the only requirement. The can 10 is then sealed and a vacuum 14 is placed on end 16 and end 18 (see FIG. 2). Once the vacuum 14 is in place at both ends and the can 10 sealed, the vacuum is turned on and remains on throughout the entire process. The presence of a vacuum removes all gases and impurities that are produced during the various phases of the overall process which detract from the purity and structural integrity of the final product.

End 16, is also attached to an igniter 20. The igniter 20 should be preferably an electrical system of tungsten wires or carbon strips of well-known design. Alternatively, an electrical arc can be used as an igniter if the can is left open. The end 16 with the vacuum 14 and igniter 20 is then squeezed so the end will fit into a rolling system 22. The squeezing can be accomplished by placing the end 16 in a vise (not shown) and tightening the vise or placing the end 16 between plier clamps (not shown) and tightening the pliers. When squeezing end 16, damage to the vacuum 14 and igniter 20 is to be avoided as well as damage to the continuity of the can 10.

The can 10 is then surrounded by a commercial furnace 11 for outgassing (see FIG. 3). The commercial furnace should be one that is easily fitted around the can 10 and can reach a temperature above 100° C. quickly. The furnace is used to remove impurities such as water from the powder 12 in the can 10 (a longer time should be allowed for impurity removal the thicker the can 10).

The furnace 11 is then removed and the end 16 of the can 10 is inserted into the rolling system 22. The can 10 is then rolled through the rolling system cold, otherwise known as cold-rolling. The cold-rolling of the can 10 causes approximately a 50% reduction in thickness of the can. The cold rolling serves to reduce any voids in the powder 12 that were left from the filling of the reactant powders in the can, as well as overall compression of the interstices between the individual granules that form the powder 12.

Graphite cloth 24 (not shown) is wrapped tightly around the can 10. The graphite cloth 24 protects the rolling mechanism in the event the can 10 melts during the SPS process. If the can 10 does melt, the graphite cloth 24 can be peeled off of the resultant ceramic after cooling has occurred.

The hot rolling of the can 10 proceeds after the above-described steps. The igniter at the can end 16 is used to begin the SPS process. Once ignited the powder 12 in can 10 burns similar to a fuse. The chemical reaction that forms the high technology ceramic occurs at the reaction front of the SPS process in the can. The SPS process makes the hot rolling of ceramics a reality due to sufficiently high temperatures being reached such that local melting of the powder 12 in the can 10 forms the high-technology ceramics The reaction front which involves this melting moves at velocities compatible with hot rolling of ceramics.

After the squeezed end 18 is placed between the rolling system 22, the igniter is caused to ignite the powder at the end of the can 10. As the reaction front of the SPS process proceeds, the can 10 is moved through the rolling system so that the reaction zone with its liquid phase is always under the rolls 26 of the rolling system 22. The rolling speed can be controlled by a technician who cranks the rolling system at a rate compatible to keeping the reaction front underneath the roll 26 since the heat from the reaction front causes a change in color of the can and can thus be observed by the eye. The rolling speed can also be controlled by a sensor system that controls the speed of the rolling compatible to the speed of the reaction front so the reaction front is maintained under the rolls 26. After the hot rolling process is completed and the can 10 has had time to cool, the can 10 is stripped away from the high technology ceramic that has formed. Such an approach as described above, can be applied to a variety of important ceramics such as $TiB_2$, $B_4C$ and $TiC$ to name a few.

One embodiment of many possible embodiments of the present invention will now be described. It should not be construed in any way that this invention is limited to the following description.

A stainless steel can 10 22.75 inches long with a $1\frac{1}{8}$ inch outside diameter and a 1 inch inside diameter is obtained (see FIG. 1). The inside of the can is insulated first with saffil TM (not shown) ceramic felt and then with a layer of graph foil TM (not shown). This provides insulation to prevent the stainless steel can 10 from melting. Next a few inches of fiberfax TM 30 should be stuffed into the can 10 up to crimp 32 after crimping occurs. The crimping is accomplished with the use of a standard vise (not shown) and is done to enable the can 10 to fit into the rollers 26 of the rolling system 22. The fiberfax 30 prevents the vacuum 34 from pulling metal powder out of the sample chamber 36 into other parts of the system. The sample chamber 36 is defined in the can 10 by the area between crimp 32 and 33. The sample chamber is where the powder constituting the ceramic is located. Crimps 32 and 33 leave not less than 0.25 inches of free space inside the can 10. Once the fiberfax TM has been inserted into can 10 enough thoroughly mixed titanium and Boron powders of the appropriate molar mixture, commonly one mole of Titanium and two moles of Boron to produce $TiB_2$, is added from the end of the can 10 closest to crimp 33 to fill the sample chamber 36. The powder 12 should be packed with a rod and more added as space is provided until the sample chamber 36 is full (before cold rolling). FIG. 1 shows the sample chamber 36 after cold rolling has occurred.

After the sample chamber has been filled, enough reactant powders are added for easy ignition. These reactant powders may be same as those to be rolled or those for some other easier ignitable system, such as Ti and B. These igniter reactants are added (approximately 10 g.) so that the igniter tip 40 is completely submerged in the igniter reactants 38 when all igniter fittings 20 are in place. The igniter wire 60 of ingnitor system 40 is Polycarbosilaine (PCS TM) polymer coated (to prevent electrical shorting to the reactant powders) and then inserted into the can 10. Care should be taken not to let any part of the tungsten igniter come in contact with any metal parts throughout the system on a short will occur and ignition will not take place. After the igniter tip 40 of igniter 20 is inserted into the igniter powder Fiberfax TM should be stuffed into can end 35 so as to ensure no powder loss due to vacuum pull. A brass necklace 42 with clearance holes for 3 10/32 inch screws 44 is fitted over the can 10 about 6 to 8 inches from crimp 33. A medium size hose clamp 46 is then fit over the can 10 so it rests alongside the brass necklace 42. Cooper T-tube 48 then is inserted into the can 10 as shown in FIG. 4. A second brass necklace 50 is machined so as to be press fit onto the copper T-tube. The partner necklace 42, which fits over the can 10 (see FIG. 2) is held fast by a now tighened hose clamp 46 which is secured tightly to the copper T-tube 48. The 10/32 inch screws 44 are fitted through necklaces 42 and 50 and tightened thus causing the pressure that holds the t-tube to the can to be applied directly to O-ring 52 and completing the vacuum seal. The copper t-tube 48 is 2.3 inches long from the edge of brass necklace 50 to the beginning of end 56. End 56 is 0.8 inches long, has an o.d. of 1 inch and an I.D. of inches threaded. End 64 that connects to vacuum tube 70 is 0.5 inches long and has a 1 inch outside diameter. The stem 65 is 0.8 inches long. The brass necklace 50 is 0.75 inches wide and has an O.D. of 2.5 inches. A large O-ring 52 is seated alongside the brass necklace 50 and has an O.D. of 1/16 inches, an I.D. of 1 1/16 inches and a width of $\frac{1}{8}$ inches. There are 3 10/32 inch tapped screw holes $57\frac{1}{4}$ inch deep in the necklace 50 that allows the necklace 42 attached to the can 10 to be tightly fitted with the t-tube 48. The end 53 is male unthreaded and fits a 1 1/18 inch can 10.

The igniter system 20 is shown in detail in FIG. 5. It has a filament-tip 100 that is comprised of 0.030" diameter tungsten wire 82 that has 7 tight wound turns 83. The tip 40 is attached to 0.060 tungsten wire 60 by crimping between the platinum clips 102. The tungsten wire 60 runs straight throughout the igniter system 20. From the tip 40, the wire 60 runs through a 4 hole bored alumina ($AL_2O_3$) fitting 104 that is 1" long and 0.30" in diameter. The wire 60 then runs through a double-threaded bolt 58, afterwhich it passes through a vitron rubber vacuum fitting 106, another 4-hole bored alumina fitting 108 which is identical to 104, a vitron compressing fitting with spin lock 110, a 4 hole bored alumina fitting 112 and a capping nut for a double threaded bolt 14 in that sequence. The double-threaded bolt 58 is 2.2 inches long and has 0.88 inch threads. The vitron rubber vacuum fitting 106 has a length 8 inches long by 0.5 inches wide at its long end. The vitron compressing fitting with spin lock 110 is 1.10 inches long and 0.5 inches in diameter. The alumina fitting 112 is 0.5 inches long by 0.3 inches in diameter. Lastly, the capping nut 114 is 1 inch long by 1 inch wide with 0.88 inch threads. The ends 116 of wire 60 are free past capping nut 117. From platinum clips 102 to the end 116 of wire 60 the system is 76 inches long. Before assembling the system 54 and inserting into the copper t-tube 56, the entire igniter wire 60 is immersed in polymer polycarbosilene (PCS), and then dryed for ½ hour at 100° C. The PCS TM insulates the system and prevents the possibility of a short.

The igniter system 20 as shown in FIG. 4, once assembled, screws into end 56 of the copper t-tube 48 via the double-threaded bolt 58. For this system, there should be approximately 12 inches of tungsten igniter 60 protruding from the left end of the copper t-tube 48 once this connection is made. The tungsten igniter tip 40 is located deep in the can 10 (almost to the sample chamber 12), when the t-tube 48 is finally attached to the can 10. It should be noted that all screw fitting in this system must be insulated with teflon tape wrapped around the male connections before the female connections are attached for a good vacuum to be possible. Additionally, for the system to be complete a rubber vacuum hose 70 with a 1 inch I.D. and at least 2 inch O.D. preferably, is hand fitted over copper extension 64 and sealed with vacuum grease.

Once the system is set up for outgassing all vacuum hose joints as well as the mechanical joints at the igniter system fittings 20 should be sealed with vacuum grease. Then the mechanical pump 64 can be turned on (not the diffusion pump 69) until the vacuum is down to about 300 millitorr as given by the digital readout 68. Once this is achieved, the diffusion pump 66, which is in series behind the vacuum pump 64 with respect to the sample 36, may be turned on. This is continued until the best possible system vacuum is achieved. The vacuum hoses 70 used were typically 10-15 ft long as dictated by room set up and equipment placement. This length should be minimized, however, in order to achieve best possible vacuum.

Figure 2:
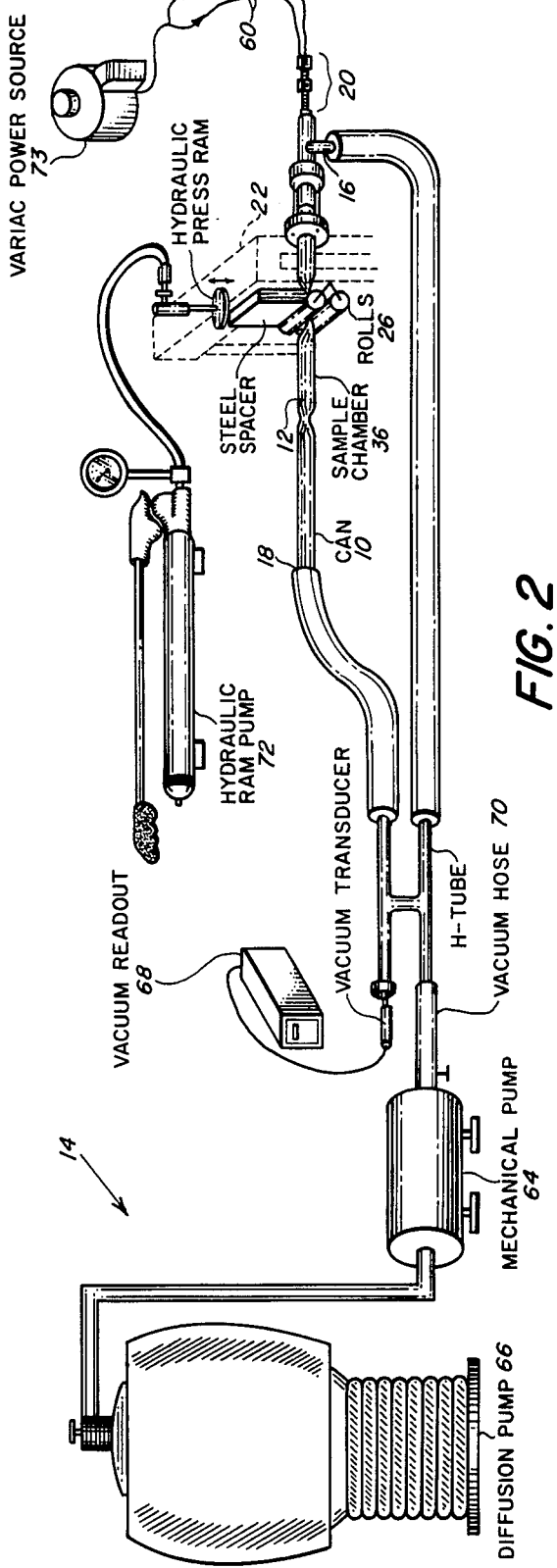
FIG. 2 is a schematic drawing of the hot rolling system.

The pressure exerted by the hydraulic ram pump 72 on the rolls 26 and consequently on the can 10 immediately after ignition is 2000-3000 psi. The rolling system 22 was customized with an ENERPAC TM hydraulic press 72 to create an adjustable or constant pressure rolling mill. FIG. 2 shows only the very basic components of the rolling system.

For outgassing (previous to ignition), a VARIAC TM 73 power source is hooked up to a 13 inch long clamshell furnace 11 which surrounds the stainless steel can 10 in the sample chamber area 36. The can 10 must be insulated from the heating elements to prevent shorting out, and the outside of the heater should be insulated with fiberfax. Typical samples are outgassed to approximately 500° C. The VARIAC TM 73 should be set at about 50 units for 1.5 hrs. to achieve this temperature. A k thermocouple 74 is attached directly to the can 10 in the sample area 36 with high temperature tape (not shown) and thermocouple leads 76 then go to a digital k trendicator 78 as shown. During heating the igniter wires 60 are attached to the leads of a digital ohmmeter 80 so that the igniter resistance throughout the system can be monitored as a function of temperature. The purpose of this is to make sure the PCS polymer coating on the igniter tip 40 remains intact. Typically at room temperature the resistance R equals 0.15 ohms for the cooled igniter in the powder. If the resistance drops below 0.05 ohms while heating, the igniter will probably fail due to loss of the polymer derived coating from the tip 40.

The sample area 36 is then cold rolled through the rolling system 22 after the clamshell furnace is removed. The cold rolling step may reduce the can 10 thickness by 50 percent. For ignition (after outgassing), the 2 thick (0.060 inch diameter) tungsten igniter wires 60 which protrude from the igniter system 20 are hooked up to the VARVAC power source 72 (15 Volt input, 0 to 130 scale), and the system is given an impulse power of 100 units on the scale for 1 second. The polished steel rolls 26 will not bite into the stainless steel can 10 by itself, so the two rolls 26 must each be wrapped with a layer of 3M 60 grain wet silicon carbide or dry Fabricot TM mesh before cold and hot rolling.

Once ignition does occur the igniter ignites the powder Ti+2B in front of crimp 32. The ignited $TiB_2$ propagates to the sample chamber 36, in turn igniting the powder in the sample chamber 36.

During hot rolling, the location of the propagation front of the SPS process is kept at or near the center of the rolling pins 26 so the pressure from the rolls 26 is applied to the hottest, and hence most plastic powder. It is often advantageous to use a reaction that produces a temporary or permanent plastic or liquid phase, e.g. excess Ti in producing TiC or $TiB_2$. An observer cranks the rolling system to maintain the propagation front of the SPS process at the desired location. For $TiB_2$ the speed of propogation of the propagation reaction front, and thus the speed at which the can 10 is rolled through the rolling system, is about 5.2 CM/S.

Other typical average propogation rates for example are TiC+10 v/o Ti at a rate of 1.2 cm/S, $3TiB_2+5Al_2O_3$ at rate of 0.3 CM/S and $TiB_2+TiC$ at a rate of 2.5 CM/S.

Obviously, numerous additional modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A method for producing high technology ceramics with minimal porosity comprising the steps of:
   filling a can with constituent powders of a ceramic;
   igniting the powders at a localized point so a reaction front is created in the powder that propogates from the point; and
   applying localized pressure to the can such that the propagation reaction front in the ignited powder is subjected to the pressure.

2. A method as described in claim 2 wherein the applying localized pressure step further includes applying localized pressure to the can by rolling the can through a rolling system such that the propagation reaction front in the ignited powder remains in between rolling pins of the rolling system.

3. A method as described in claim 2 which includes the additional step of rolling the can through the rolling system without the powder being ignited, said additional step occuring before the ignition step and after the filling step.

4. A method as described in claim 3 that further includes the steps of outgassing the powder in the can by placing a furnace around the area of the can that encloses the powder and heating the furnace to at least 100 0 C. and
removing said furnace from around the can after at least five minutes of heating during said outgassing step: a said removing step occuring before the cold rolling step and after the filling step.

5. A method as described in claim 1 wherein a vacuum is maintained in the can described in claim 1.

6. A method as described in claim 4 wherein a vacuum is maintained in the can during the steps described in claim 4.

7. A method as described in claim 1 wherein during the filling step the powder that the can is filled with, is a mixture of Titanium and Boron.

8. A method as described in claim 6 wherein during the filling step the powder that the can is filled with, is a mixture of Titanium and Boron.

9. A method as described in claim 1 wherein during the filling step the powder that the can is filled with, is a mixture of $Al + TiO_2 + B_2O_3$.

10. A method as described in claim 6 wherein during the filling step the powder that the can is filled with, is a mixture of $Al + TiO_2 + B_2O_3$.

11. A method as described in claim 1 wherein during the filling step the powder that the can is filled with, is a mixture of $Ti + B + C$.

12. A method as described in claim 6 wherein during the filling step the powder that the can is filled with, is a mixture of $Ti + B + C$.

13. A method as described in claim 1 wherein during the filling step the powder that the can is filled with, is a mixture of $Ti + C$.

14. A method as described in claim 6 wherein during the filling step the powder that the can is filled with, is a mixture of $Ti + C$.

15. A method as described in claim 1 wherein during the filling step the powder that the can is filled with, is a mixture of Carbon and Boron.

16. A method as described in claim 6 wherein during the filling step the powder that the can is filled with, is a mixture of Carbon and Boron.

17. A method as described in claim 1 which includes the step of mixing the constituent powders before the filling step.

18. A method for producing high technology ceramics with minimal porosity comprising the steps of:
mixing constituent powders of a ceramic;
filling a can with the constituent powders;
outgassing the powder in the can by placing a furnace around the area of the can that encloses the powder and heating the furnace to at least 100° C.;
removing said furnace from around the can after at least five minutes of heating during said outgassing step;
applying localized pressure to the can by rolling the can through a rolling system;
igniting the powders at a localized point so a reaction front is created in the powder that propagates from the point; and
applying localized pressure to the can by rolling the can through the rolling system such that the propagation reaction front in the ignited powder remains in between rolling pins of the rolling system.

19. A method as described in claim 18 wherein a vacuum is maintained in the can described in claim 1.

20. A method as described in claim 18 wherein during the filling step the powder that the can is filled with, is a mixture of Titanium and Boron.

21. A method as described in claim 18 wherein during the filling step the powder that the can is filled with, is a mixture of $Al + TiO_2 + B_2O_3$.

22. A method as described in claim 18 wherein during the filling step the powder that the can is filled with, is a mixture of $Ti + B + C$.

23. A method as described in claim 18 wherein during the filling step the powder that the can is filled with, is a mixture of $Ti + C$.

24. A method as described in claim 18 wherein during the filling step the powder that the can is filled with, is a mixture of Carbon and Boron.

* * * * *